(12) United States Patent
King et al.

(10) Patent No.: US 6,441,581 B1
(45) Date of Patent: Aug. 27, 2002

(54) ENERGY MANAGEMENT SYSTEM AND METHOD

(75) Inventors: Robert Dean King; Lembit Salasoo, both of Schenectady; Dongwoo Song, Latham; Somanath Nagendra, Schenectady, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/681,335

(22) Filed: Mar. 20, 2001

(51) Int. Cl.[7] .................................................. H02J 7/00
(52) U.S. Cl. ...................................... 320/101; 307/150
(58) Field of Search ......................... 320/101; 307/10.1, 307/150; 180/65.3, 165

(56) References Cited

U.S. PATENT DOCUMENTS

| | | | |
|---|---|---|---|
| 4,597,463 A | * | 7/1986 | Barnard ...................... 180/165 |
| 5,659,240 A | | 8/1997 | King |
| 5,903,449 A | | 5/1999 | Garrigan et al. |
| 6,213,234 B1 | * | 4/2001 | Rosen et al. ................. 180/65.3 |
| 6,281,598 B1 | * | 8/2001 | King et al. .................. 307/10.1 |
| 6,331,365 B1 | * | 12/2001 | King ............................ 320/103 |

OTHER PUBLICATIONS

U.S. patent application, Ser. No. 09/190,069 filed Nov. 12, 1998, (Attorney Docket Rd–26,118), Entitled Method and Apparatus for a Hybrid Battery Configuration for Use in an Electric or Hybrid Electric Motive Power System by RD. King, Et Al.

U.S. patent application, Ser. No. 09/340,827 filed Jun. 28, 1999 (Attorney Docket No. RD–27,519) Entitled "Method an System for Predicting Incipient Failure in a Locomotive Energy Storage Unit or Energy Storage Unit Cabling" by RD. King, Et Al.

U.S. patent application, Ser. No. 09/469,129 filed Dec. 21, 1999 (Attorney Docket No. RD–27,404) Entitled A Locomotive Power System Using a Multi–Functional Power Interface Unit by RD King, Et. Al.

* cited by examiner

Primary Examiner—Gregory J. Toatley, Jr.
(74) Attorney, Agent, or Firm—Ann M. Agsoti; Jill M. Breedlove

(57) ABSTRACT

An energy management system comprises: an energy storage system comprising flywheels and batteries; and an energy storage system controller adapted to cause the flywheels and batteries to store energy during load-supplying periods and to supply energy during load-receiving periods. The flywheels may be situated in respective ones of a plurality of compartments in a vehicle platform, and the batteries may be situated above the flywheels.

44 Claims, 5 Drawing Sheets

ENERGY MANAGEMENT SYSTEM AND METHOD

BACKGROUND OF INVENTION

The invention relates generally to energy storage and management systems.

Electric vehicle propulsion systems use rechargeable traction batteries to provide electric power for driving electric motors coupled in driving relationship to wheels of the vehicles. Hybrid electric vehicle propulsion systems additionally include internal combustion engines to drive on-board generators to supplement battery power. Hybrid locomotive applications typically require about 200 kWhr (kilo Watt hours) to about 1000 kWhr of energy storage and the ability to handle peak power of about 2 MW (mega Watts) to about 5 MW. As specific power goals, specific energy goals, and energy storage costs are increasing, locomotive manufacturers are further challenged by design life cycles of twenty years coupled with severe environmental conditions such as shock/vibration and widely varying temperatures.

Uninterruptible power supply applications require energy storage technology to meet high specific power and moderately high specific energy specifications. Conventional flywheels have reasonably high specific power ranging from about 200 W/kg (Watts per kilogram) to about 2000 W/kg. Several recently designed flywheels include high strength composite materials that allow light-weight flywheel rotors to spin at speeds in excess of 50,000 rpm to achieve acceptable specific energy for uninterruptible power supply applications. The more recent designs have high energy storage costs (about 20,000 US dollars/kWhr to about 100,000 US dollars/kWhr) and require high levels of vacuum (on the order of about $10^{-6}$ torr, for example) to minimize parasitic losses. Such costs are prohibitively high for locomotive embodiments.

It would therefore be desirable to provide a cost effective and robust energy storage and management system.

SUMMARY OF INVENTION

To provide a cost effective and robust energy storage and management system, according to one embodiment of the present invention, flywheels are used in combination with batteries and an energy storage system controller.

Briefly, in accordance with a more specific embodiment of the present invention, an energy management system comprises: an energy storage system comprising flywheels and batteries; and an energy storage system controller adapted to cause the flywheels and batteries to store energy during load-supplying periods and to supply energy during load-receiving periods.

In accordance with another embodiment of the present invention, an energy management system comprises an energy storage system comprising a vehicle platform including a plurality of compartments; a plurality of flywheels situated in respective ones of the plurality of compartments; and a plurality of batteries situated above the plurality of flywheels.

BRIEF DESCRIPTION OF DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION

For purposes of example, embodiments of the present invention are described generally in the context of vehicles and, more specifically, heavy duty vehicles such as locomotives. However, the present invention is applicable in any energy management system embodiment. As one example, the present invention would be advantageous in embodiments requiring uninterruptible power supplies.

Figure 1:
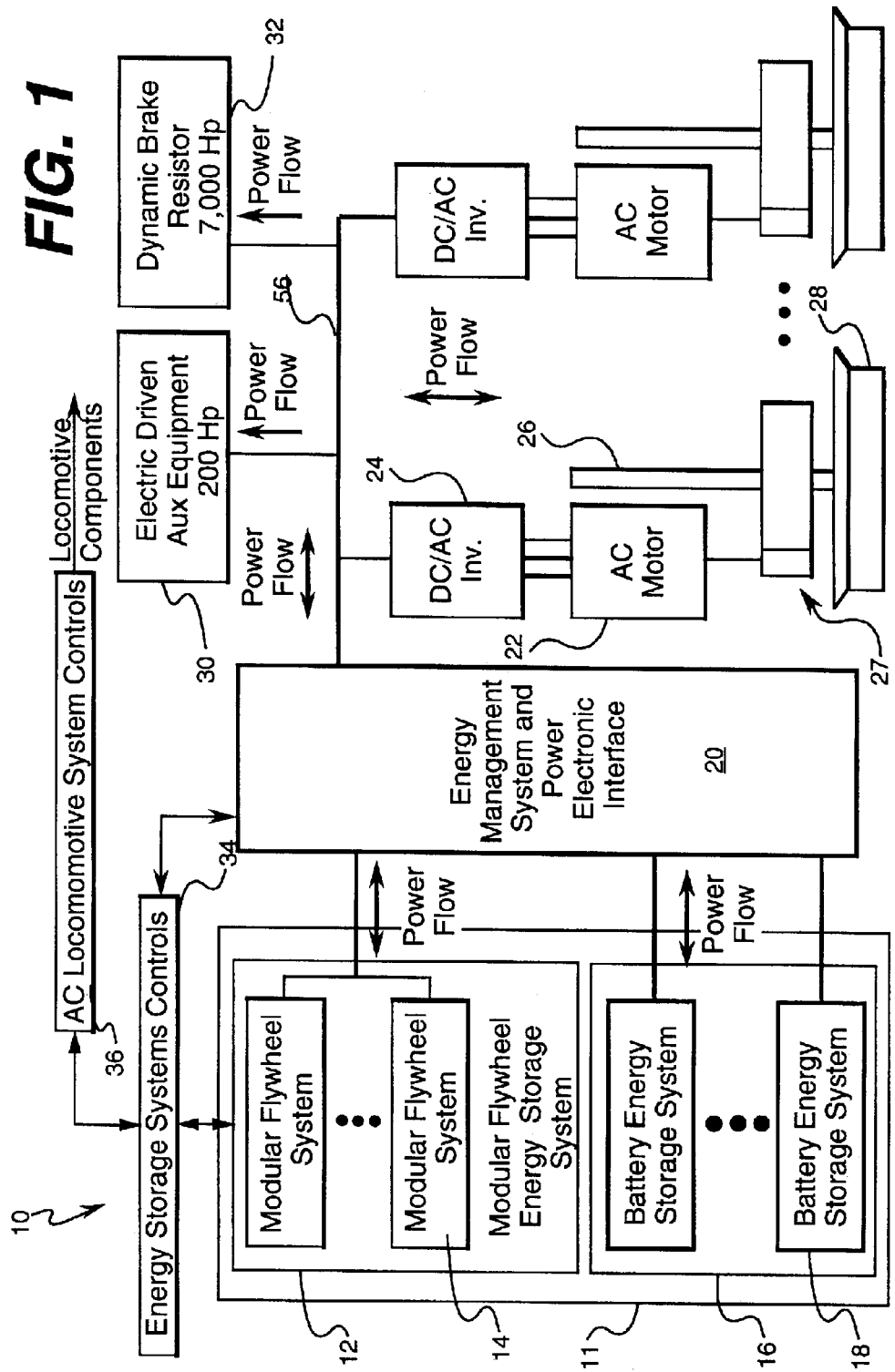
FIG. 1 is a block diagram of an energy management system in accordance with one embodiment of the present invention.

FIG. 1 is a block diagram of an energy management system 10 in accordance with one embodiment of the present invention wherein the energy management system comprises an energy storage system 11 comprising flywheels 14 and batteries 18; and an energy storage system controller 34 adapted to cause the flywheels and batteries to store energy during load-supplying periods and to supply energy during load-receiving periods.

"Load-supplying" periods include periods when the load has excess energy that needs to be removed from the load. "Load-receiving" periods include periods when the load requires energy to be supplied. Some embodiments may have modes of operation wherein the load does not need to dissipate excess energy or receive energy from energy storage system 11; or wherein the load requires a minimal amount of energy (such as, for example, less than or equal to about twenty-five percent of the maximum normal operational energy); or during periods of conventional operation with power from another power supply (for example, when in a conventional vehicle or diesel locomotive operation such that the diesel engine (not shown), through the main alternator (not shown), supplies the energy to the DC link and to the load via traction inverters 24 to machines 22 which are in turn mechanically coupled to wheels 28 through shafts 26 and gears 27). These periods are referred to herein as "load-neutral" periods. As one example, in a vehicle such as a locomotive, load-supplying periods (also commonly referred to as "dynamic braking" periods) typically comprise deceleration periods and periods wherein the vehicle is maintaining a constant speed on a downward incline; load-receiving periods typically comprise acceleration periods or periods wherein the vehicle is maintaining a constant speed on an upward incline; and load-neutral periods typically comprise periods wherein the vehicle is operating at a standstill or wherein the vehicle is maintaining a constant speed on a substantially flat surface. For purposes of example, the load in FIG. 1 comprises inverters 24 for receiving electrical energy via a DC link 56 and for providing electrical energy to machines 22 which may comprise AC traction motors, for example, which are in turn mechanically coupled to wheels 28 through shafts 26 and gears 27.

The energy management system may further comprise an electronic interface 20 for supplying power to energy storage system 111 during the deceleration/load-supplying periods and for receiving power from energy storage system 11 during the constant speed and acceleration/load-receiving periods.

Electronic interface 20 may comprise any appropriate analog and/or digital circuitry. In one embodiment, the electronic interface comprises at least one bi-directional voltage converter. One example of a bi-directional voltage converter and associated control system elements (which, in embodiments of the present invention may comprise part of the energy storage system controller and/or the electronic interface) is described in commonly assigned Garrigan, et al. U.S. Pat. No. 5,903,449. Energy storage system controller 34 may also provide control signals to electronic interface 20 as well as exchanging information with optional further controllers such as locomotive system controller 36 of FIG. 1.

Batteries 18 of a battery energy storage system 16 are intended to include one or more types of conventional batteries such as lead acid, nickel cadmium, nickel metal hydride, and lithium ion batteries, for example, as well as other types of electrically rechargeable devices such as high specific power ultracapacitors, for example. Flywheels 14 of a flywheel energy storage system 12 may include respective converters, may share a converter, or may be coupled to at least one converter of electronic interface 20. In one embodiment, energy storage system controller 34 comprises a first converter for flywheel energy storage system 12 and a second converter for battery energy storage system 16.

Energy storage system controller 34 sends power commands to energy storage system 11 which are dependent on states of charge and of operability of flywheels 14 and batteries 18. Examples of useful sensors for obtaining state of charge information include flywheel state of charge sensors such as speed sensors and a battery state of charge sensors such as charge/discharge current, voltage and/or ampere-hour sensors. If desired, computational estimations of state of charge can be used. Ideally energy storage system controller 34 selects power commands to distribute charge evenly among the flywheels 14 of flywheel energy storage system 12 unless one of the flywheels is experiencing a fault. In the event of a fault, power is redistributed to operable flywheels. In a similar manner, energy storage system controller 34 generally sets power commands to distribute charge evenly among the batteries 18 of battery energy storage system 16.

In an exemplary load-supplying sequence embodiment, energy storage by flywheels and batteries is controlled by the energy storage system controller such that the received power is first directed to the flywheels. When the flywheels are fully charged, received power is stored by batteries. If flywheels and batteries are fully charged, excess energy is dissipated. A resistor 32 can be used, for example, for dissipating power during deceleration periods when the flywheels and the batteries have reached maximum storage capabilities. In one embodiment, resistor 32 comprises a dynamic brake grid resistor.

Correspondingly, in an exemplary load-receiving embodiment, energy is first supplied by flywheels 14. When flywheel energy is exhausted, energy is supplied by batteries 18. When battery energy is exhausted, energy is supplied by a supplemental energy supply (not shown). In locomotive embodiments, for example, the supplemental energy supply may comprise internal combustion engines driving on-board alternators or generators.

In load-neutral sequences, flywheel energy can be supplied to auxiliary equipment 30, for example. In an optional embodiment, the energy storage system controller and electronic interface are further adapted to cause the flywheels to supply energy to the batteries during the load-neutral periods. In such embodiments, it is helpful for interface 20 to include a bi-directional boost converter for converting the voltage from the flywheel system to the battery. In another optional embodiment the energy storage system controller is further adapted to, if the flywheel charge level has dropped below a predetermined amount, cause the batteries to supply energy to the flywheels prior to initiating an acceleration period from a stationary position, prior to starting an uphill grade, or prior to entering a tunnel. Further, if a charge level in the flywheels has dropped below a predetermined amount, and if the charge level in the batteries is below a predetermined amount, energy can be supplied to the flywheels from the supplemental energy source. In these embodiments, the charged flywheels can then be used to provide an additional boost of power while the locomotive is accelerating from the stationary position, prior to starting an uphill grade, or prior to entering a tunnel.

Although flywheels have high specific power (typically at least 200 W/kg, for example) in locomotive applications, for example, flywheels are heavy and typically do not have energy storage capability sufficient to store the required amounts of energy within the allowable weight budget. Batteries have high energy capabilities (typically at least about 200 kWhr in locomotive applications, for example) and can accept moderate power levels during regenerative braking.

Using the flywheels helps to capture energy that would have been wasted in conventional battery embodiments. Because energy has a shorter storage life in a conventional flywheel than a battery, designating the flywheel to be the first source of supplying energy to the load and/or as a source of supplying energy to the batteries results in an efficient, reliable energy management system. Because the energy does not need to be stored in the flywheels for long periods of time, the flywheel design can tolerate a level of parasitic loads that would not be acceptable for an energy storage system that includes only flywheel energy storage. The system does not require complex and expensive ultra-vacuum systems that are required to maintain the flywheel compartment vacuum at levels below $10^{-4}$ torr, for example, but rather at less complex and more reliable moderate vacuum levels, and possibly no vacuum at all and it is expected that fuel usage (for the supplemental energy supply) and associated emissions can be reduced.

Figure 2:
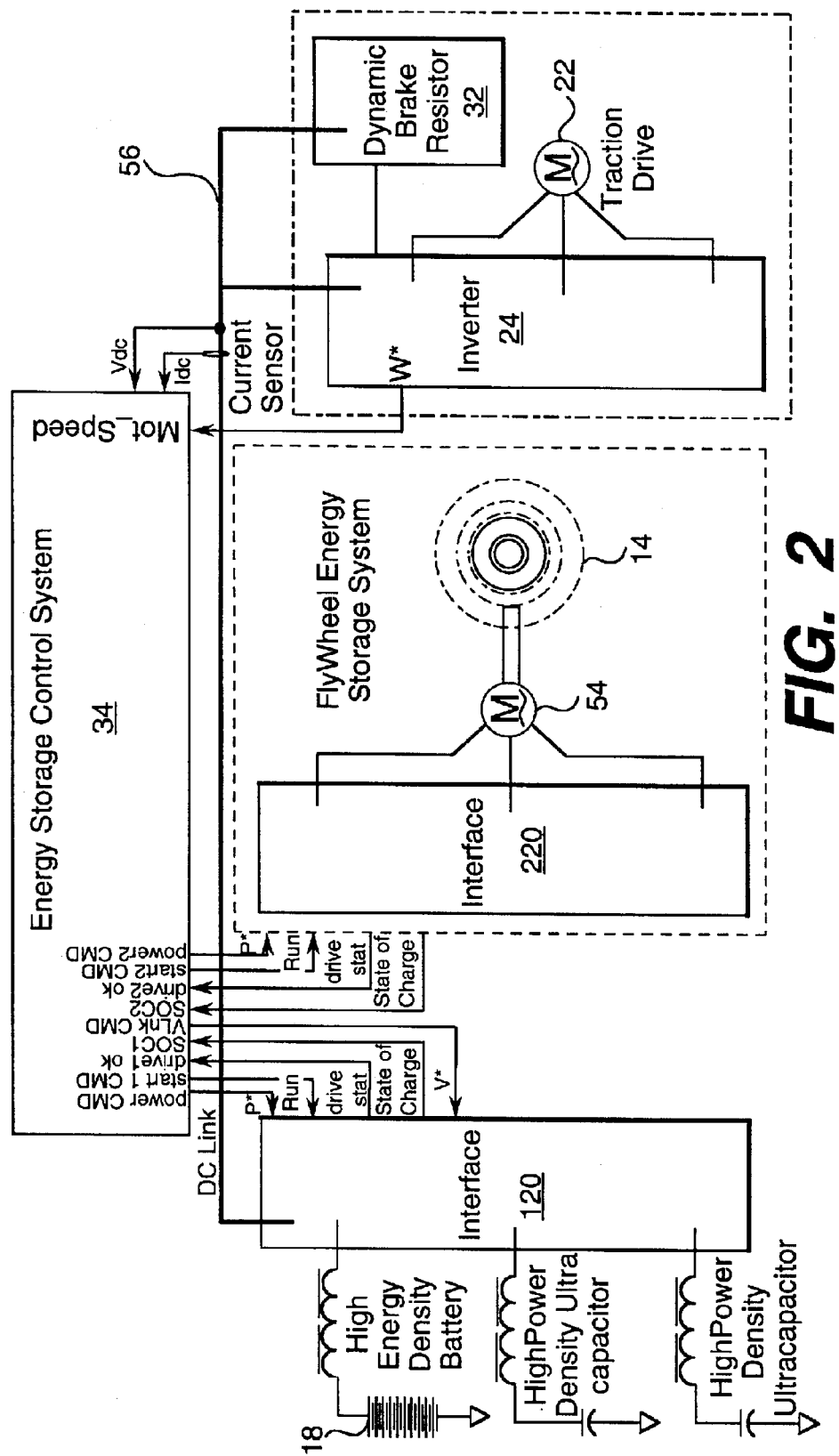
FIG. 2 is a block diagram of an energy management system in accordance with another embodiment of the present invention.

FIG. 2 is a block diagram of an energy management system in accordance with another embodiment of the present invention. In the embodiment of FIG. 2, electronic interface 20 of FIG. 1 comprises a first interface 120 for the battery energy storage system and a second interface 220 for the flywheel energy storage system with each of the first and second interfaces adapted for being coupled to DC link 56.

Figure 3:
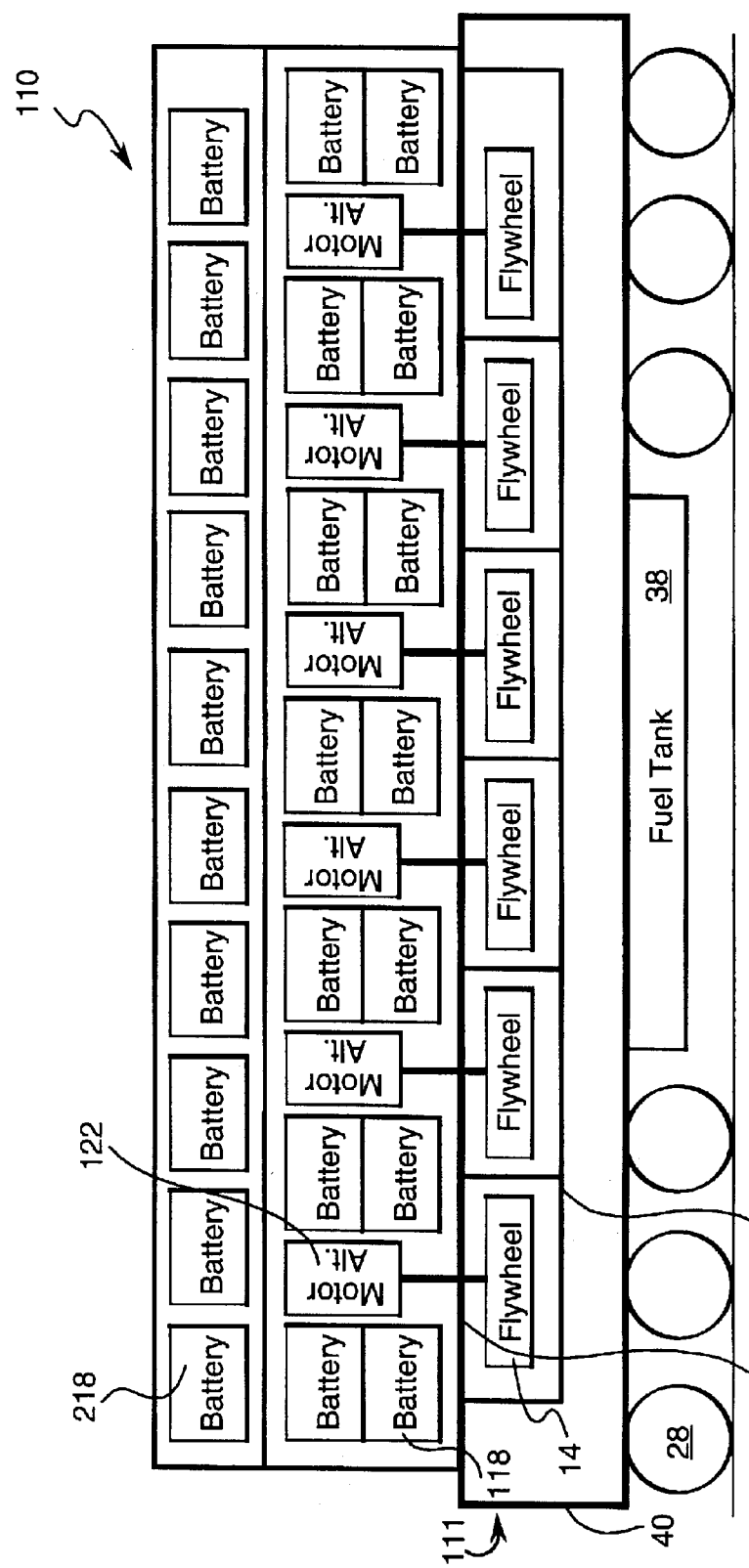
FIG. 3 is a side view of an example packaging configuration for use in accordance with another embodiment of the present invention.

In an optional embodiment of FIG. 2, a flywheel motor 54 couples the flywheel's mechanical energy storage system and second interface 220. As an example, flywheel motor 54 could be an ac induction motor (similar to the traction motor 22) and therefore the interface 220 is an inverter (similar to 24) that converts the ac electrical energy to the electrical dc link. Interface 120 converts the energy from the dc link to the battery energy storage system 18 as described in FIG. 1. FIG. 3 is a side view of an example packaging configuration for use in accordance with another embodiment of the present invention wherein energy management system 110 comprises an energy storage system 111 comprising: a vehicle platform 40 including a plurality of compartments 44; a plurality of flywheels 14 situated in respective ones of the plurality of compartments; and a plurality of batteries 18 situated above the plurality of flywheels.

When energy management system 110 comprises a locomotive, for example, a conventional platform typically has a mass of about 27,000 kilograms (60,000 pounds) and can be modified to provide compartments 44 for bottom-wise and side-wise containment of the flywheels. In one embodiment, a plurality of compartment covers 42 comprising steel plates are situated above respective flywheels (prior to situating of the batteries) and compartments for top-wise containment of the flywheels. If desired, machines 122 may be coupled to the flywheels. Machines 122 typically comprise bi-directional machines which operate as motors when providing electrical energy to flywheels 14 and as alternators when converting mechanical energy from the flywheels into electrical energy.

Figure 4:
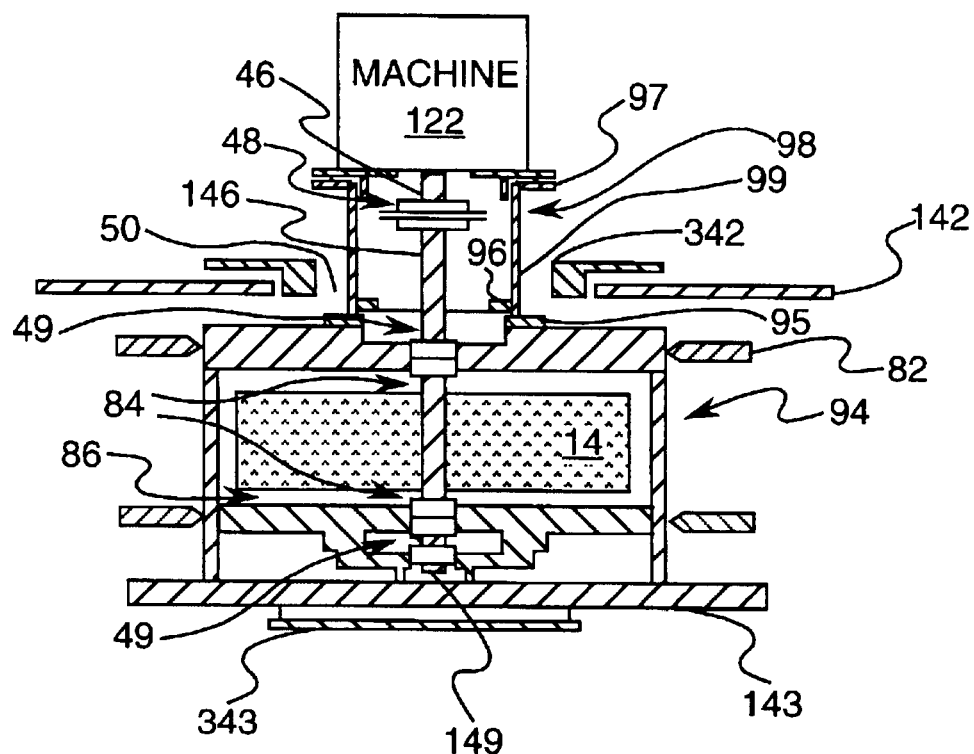
FIG. 4 is a side view of an example flywheel embodiment for use in the embodiment of FIG. 3.

FIG. 4 is a side view of an example flywheel embodiment for use in the embodiment of FIG. 3 wherein compartment covers 142 comprise removable compartment covers including holes 50 through which flywheels can be coupled. In an embodiment of FIG. 4, for example, the flywheels are physically coupled to machines 122 through shafts 46 and 146, optional coupler 48 (which may comprise a flexible coupler or a spline coupler, for example), and optional radial bearings 49.

In one embodiment, moderate vacuum seals 84 are used to maintain the flywheel in a moderate vacuum chamber 86 to reduce parasitic windage and friction of the flywheel. In this embodiment, the vacuum seals are used between the shaft 146 and interior flywheel compartment side of compartment cover 142 on the upper side of the flywheel compartment and between shaft 146 and surface 143 on the interior side of the flywheel compartment on the lower side of the flywheel compartment. Surface 143 may comprise a surface of the compartment itself or a second compartment cover. In the embodiment of FIG. 4, bearings 49 are located exterior to the vacuum chamber to facilitate bearing lubrication and bearing maintenance. Optional bearing inspection covers 342 and 343 can further facilitate bearing maintenance. Vibration isolators 82 may be used to reduce vibration in the vacuum chamber, around the bearings, and in machine 122. Further structural support can be provided by an optional thrust bearing 149.

In a more specific embodiment, a mount 98 couples machine 122 and bearing 49, permits machine 122 to be mounted on the same structure 94 as flywheel 14 and thus permits both the machine and the flywheel to be isolated from the vehicle platform. This embodiment minimizes the amount of displacement experienced by coupler 48. Mount 98 may comprise any appropriate structure and may include, for example, a surface 97 adaptable to a D-flange or C-face machine and a cylindrical support tube 99 comprising a material such as a metal, for example. If desired, an access cover (not shown) can be included within mount 98 for inspection and/or disassembly of coupler 48. Tube 99 of mount 98 can be mounted to a cap 95 of bearing 49 or the tube can incorporate the bearing cap. The bearing cap itself can be mounted to flywheel structure 94 by any appropriate technique and, in one embodiment is mounted by bolts (not shown), for example. In one embodiment, a snap ring 96 is used to retain bearing 49 within tube 99.

Although vacuum seals 84 and vacuum chamber 86 are shown for purposes of example in FIG. 4, in another embodiment of FIG. 4, the vacuum seals and vacuum chamber are not used. This embodiment is useful for applications wherein the combination of the machine mount 98 and the vibration isolators 82 is sufficient to maintain the structural integrity.

In yet another embodiment of FIG. 4, the flywheel compartment does not include a vacuum; shafts 46 and 146 comprise an integral shaft; and coupler 48, bearings 49, and vacuum chamber 86 are not used. In this embodiment, the vibration isolators 82 are used to reduce vibration on the integral machine and flywheel assembly.

Figure 5:
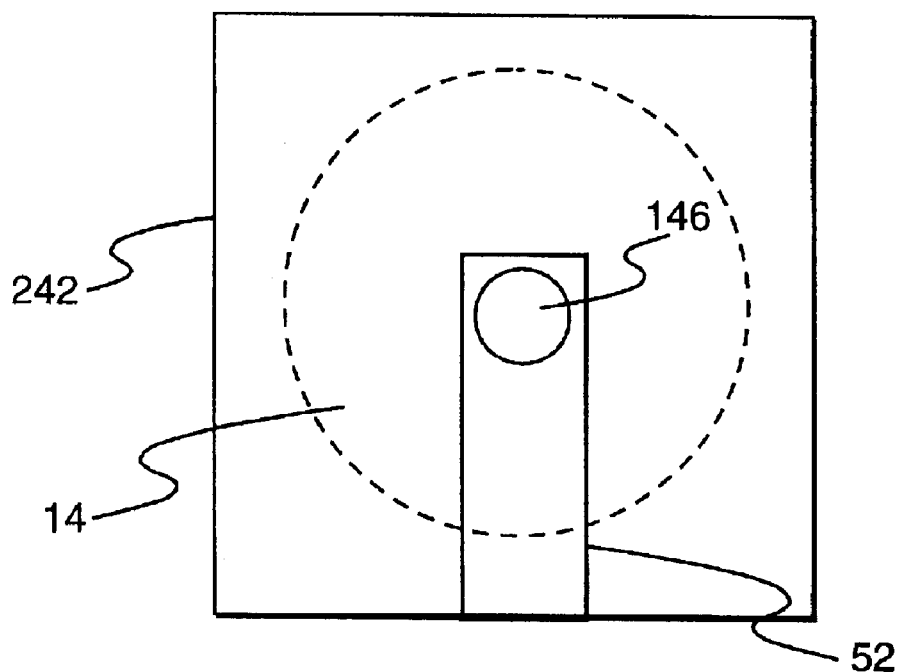
FIG. 5 is a top view of another example flywheel embodiment for use in the embodiment of FIG. 3.

FIG. 5 is a top view of another example flywheel embodiment for use in the embodiment of FIG. 3 wherein compartment covers 242 include slots 52 through which flywheels can be coupled. When slots 52 are used, a side compartment cover (not shown) can be used to permit a flywheel to be changed out (with shafts 146 being inserted through the slots) without disturbing the batteries, for example. In this embodiment, if desired, slots can be fabricated in platform 40 rather than in top compartment covers.

As shown in FIG. 3, batteries 118 can be mounted in layers on top of the compartment covers. By situating at least some of the plurality of batteries at least partially on top of the respective compartment covers, for example, the masses of the respective batteries are applied to respective compartment covers and the batteries themselves thus assist in flywheel containment. Such containment is important in the event of a failure of a flywheel. Again, because some embodiments of the present invention do not require a sophisticated ultra-vacuum system and other do not require any vacuum system, cost is reduced, and reliability is increased.

Figure 6:
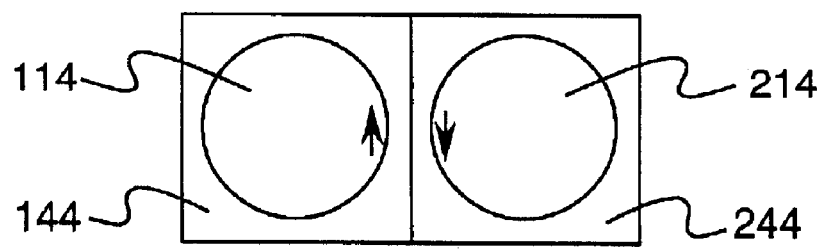
FIG. 6 is a schematic top view of a pair of flywheels in accordance with another embodiment of the present invention.

FIG. 6 is a schematic top view of a pair of flywheels in accordance with another embodiment wherein pairs of adjacent flywheels 114 and 214 in adjacent compartments 144 and 244 comprise flywheels having opposite directions of rotation. By arranging flywheels in vertical axis pairs to be rotating in opposite directions, the flywheel mechanical forces counteract each other and help to prevent derailment in heavy vehicle embodiments while negotiating turns in the direction of vehicle travel.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:
1. An energy management system comprising:
   (a) an energy storage system comprising flywheels and batteries; and
   (b) an energy storage system controller adapted to cause the flywheels and batteries to store energy during load-supplying periods and to supply energy during load-receiving periods.
2. The energy management system of claim 1 wherein the load-supplying periods comprise deceleration periods and the load-receiving periods comprise acceleration periods.
3. The energy management system of claim 2 further comprising a resistor for dissipating power during deceleration periods when the flywheels and the batteries have reached maximum storage capabilities.

4. The energy management system of claim 2 further comprising an electronic interface for supplying power to the energy storage system during the deceleration periods and for receiving power from the energy storage system during the acceleration periods.

5. The energy management system of claim 2 wherein the electronic interface comprises at least one bi-directional voltage converter.

6. The energy management system of claim 2 wherein the energy storage system controller is further adapted to cause the flywheels to supply energy to the batteries during load-neutral periods.

7. The energy management system of claim 2 wherein the electronic interface comprises a first interface for the battery energy storage system and a second interface for the flywheel energy storage system.

8. The energy management system of claim 7 wherein each of the first and second interfaces is adapted for being coupled to a DC link.

9. The energy management system of claim 8 further including a motor coupling the flywheel energy storage system and the second interface.

10. A locomotive energy management system comprising:
   (a) an energy storage system comprising flywheels and batteries;
   (b) an energy storage system controller adapted to cause the flywheels and batteries to store energy during deceleration periods and to supply energy during acceleration periods; and
   (c) at least one bi-directional voltage converter for supplying power to the energy source system during the deceleration periods and for receiving power from the energy storage system during the acceleration periods.

11. The locomotive energy management system of claim 10 wherein the energy storage system controller and the at least one bi-directional voltage converter are further adapted to cause the flywheels to supply energy to the batteries during load-neutral periods.

12. The locomotive energy management system of claim 10 wherein the energy storage system controller is further adapted to cause the batteries to supply energy to the flywheels prior to initiating an acceleration period from a stationary position, starting an uphill grade, or entering a tunnel.

13. An energy management system comprising an energy storage system comprising:
   a vehicle platform including a plurality of compartments;
   a plurality of flywheels situated in respective ones of the plurality of compartments; and
   a plurality of batteries situated above the plurality of flywheels.

14. The energy management system of claim 13 further comprising a plurality of compartment covers situated above respective flywheels and compartments.

15. The energy management system of claim 14 wherein the compartment covers comprise removable compartment covers including holes through which flywheels can be coupled.

16. The energy management system of claim 15 further including vacuum seals for providing moderate vacuum levels within the flywheel compartments.

17. The energy management system of claim 16 wherein the vacuum seals define vacuum chambers and further including bearings 49 situated outside of the vacuum chambers for coupling the flywheels and a plurality of respective machines.

18. The energy management system of claim 17 further including a plurality of mounts coupling respective machines and respective bearings.

19. The energy management system of claim 18 further including vibration isolators situated outside the vacuum chambers for reducing vibrations in the flywheels and the machines.

20. The energy management system of claim 18 wherein each mount includes a respective bearing cap for the respective bearing.

21. The energy management system of claim 13 further including a plurality of machines and a plurality of bearings 49 for coupling respective flywheels and respective machines.

22. The energy management system of claim 21 further including a plurality of mounts for coupling respective machines and respective bearings.

23. The energy management system of claim 22 further including vibration isolators for reducing vibrations in the flywheels and the machines.

24. The energy management system of claim 14 wherein the compartment covers include slots through which flywheels can be coupled.

25. The energy management system of claim 14 further including integral shafts coupling respective flywheels and respective machines.

26. The energy management system of claim 14 wherein at least some of the plurality of batteries are situated such that masses of the respective batteries are applied to respective compartment covers.

27. The energy management system of claim 26 wherein at least some of the plurality of batteries are situated at least partially on top of the respective compartment covers.

28. The energy management system of claim 14 wherein pairs of adjacent flywheels comprise flywheels having opposite directions of rotation.

29. A locomotive comprising:
   a platform including a plurality of compartments;
   a plurality of flywheels situated in respective ones of the plurality of compartments;
   a plurality of compartment covers situated above respective flywheels and compartments; and
   a plurality of batteries situated above the plurality of flywheels such that masses of the respective batteries are applied to respective compartment covers.

30. The locomotive of claim 29 wherein at least some of the plurality of batteries are situated at least partially on top of the respective compartment covers.

31. The locomotive of claim 30 wherein pairs of adjacent flywheels comprise flywheels having opposite directions of rotation.

32. An energy management method for an energy storage system comprising flywheels and batteries, the method comprising:
   during load-supplying periods, storing energy in the flywheels until the flywheels are fully charged, then storing energy in the batteries until the batteries are fully charged, and then dissipating any excess energy; and
   during load-receiving periods, supplying energy from the flywheels, then supplying energy from the batteries, and, after energy is no longer available from the flywheels or batteries, supplying supplemental energy.

33. The method of claim 32 further including, during load-neutral periods, supplying energy from the flywheels to the batteries.

34. The method of claim 32 further including, prior to initiating an acceleration period from a stationary position, starting an uphill grade, or entering a tunnel, if a charge level in the flywheels has dropped below a predetermined amount, supplying energy from the batteries to the flywheels.

35. The method of claim 32 further including, prior to initiating an acceleration period form a stationary position, starting an uphill grade, or entering a tunnel, if a charge level in the flywheels has dropped below a predetermined amount, and if the charge level in the batteries is below a predetermined amount, supplying energy to the flywheels from supplemental energy source.

36. The method claim 32 wherein the load-supplying periods comprise deceleration periods and the load-receiving periods comprise acceleration periods.

37. An energy management method comprising: situating a plurality of flywheels in respective ones of a plurality of compartments in a vehicle platform; and situating a plurality of batteries above the plurality of flywheels.

38. The method of claim 37 further comprising, prior to situating the plurality of batteries, situating a plurality of compartment covers above respective flywheels and compartments.

39. The method of claim 38 wherein situating the plurality of flywheels and situating the plurality of compartment covers comprises coupling respective shafts of the respective flywheels through respective holes of the plurality of the compartment covers.

40. The method of claim 39 further including applying respective vacuum seals to provide vacuum chambers in respective compartments and situating.

41. The method of claim 39 wherein coupling respective shafts of the respective flywheels comprises coupling respective shafts integral to respective machines.

42. The method of claim 39 wherein coupling respective shafts of the respective flywheels comprises coupling respective shafts to respective machines and further including mounting the respective machines on respective structures of the flywheels.

43. The method of claim 37 wherein situating the plurality of flywheels and situating the plurality of compartment covers comprises inserting respective shafts of the plurality of flywheels through respective slots of the plurality of the compartment covers.

44. The method of claim 38 wherein situating the plurality of the batteries comprises situating at least some of the plurality of batteries such that masses of the respective batteries are applied to respective compartment covers.

* * * * *

UNITED STATES PATENT AND TRADEMARK OFFICE
CERTIFICATE OF CORRECTION

| | | |
|---|---|---|
| PATENT NO. | : 6,441,581 B1 | Page 1 of 1 |
| APPLICATION NO. | : 09/681335 | |
| DATED | : August 27, 2002 | |
| INVENTOR(S) | : King et al. | |

It is certified that error appears in the above-identified patent and that said Letters Patent is hereby corrected as shown below:

Col. 7, line 32 (Claim 10), delete "source" and substitute therefore -- storage --.

Signed and Sealed this
Tenth Day of May, 2011

David J. Kappos
*Director of the United States Patent and Trademark Office*